United States Patent [19]

Rossmann et al.

[11] Patent Number: 4,671,735
[45] Date of Patent: Jun. 9, 1987

[54] ROTOR OF A COMPRESSOR, MORE PARTICULARLY OF AN AXIAL-FLOW COMPRESSOR

[75] Inventors: Axel Rossmann, Karlsfeld; Wilhelm Hoffmueller, Munich; Josef Eichner, Scheyern, all of Fed. Rep. of Germany

[73] Assignee: MTU-Motoren-und Turbinen-Union Munchen GmbH, Fed. Rep. of Germany

[21] Appl. No.: 692,176

[22] Filed: Jan. 17, 1985

[30] Foreign Application Priority Data

Jan. 19, 1984 [DE] Fed. Rep. of Germany ....... 3401742

[51] Int. Cl.⁴ .............................................. F01D 21/00
[52] U.S. Cl. ................................. 415/172 A; 415/174
[58] Field of Search ............. 415/174, 172 A, 170 R, 415/172 R, 173 R, 170 A, 199.4, 199.5; 416/203, 224, 144

[56] References Cited

U.S. PATENT DOCUMENTS

| | | | |
|---|---|---|---|
| 941,395 | 11/1909 | Westinghouse | 415/174 |
| 1,360,936 | 11/1920 | Guy | 416/144 |
| 2,023,111 | 12/1935 | Alsing | 416/144 |
| 3,199,836 | 8/1965 | Moyer | 416/224 |
| 3,537,713 | 11/1970 | Matthews et al. | 415/174 |
| 3,975,165 | 8/1976 | Elbert et al. | 415/174 |
| 4,148,494 | 4/1979 | Zelahy et al. | 415/174 |
| 4,218,066 | 8/1980 | Ackermann | 415/172 A |
| 4,227,703 | 10/1980 | Stalker et al. | 415/174 |
| 4,390,320 | 6/1983 | Eiswerth | 415/174 |
| 4,411,589 | 10/1983 | Joubert et al. | 415/174 |
| 4,466,785 | 8/1984 | Biswas | 415/174 |
| 4,477,226 | 10/1984 | Carreno | 416/144 |

FOREIGN PATENT DOCUMENTS

| | | | |
|---|---|---|---|
| 4739867 | 12/1969 | Japan | 415/172 A |
| 733918 | 7/1955 | United Kingdom | 415/174 |

Primary Examiner—Robert E. Garrett
Attorney, Agent, or Firm—Barnes & Thornburg

[57] ABSTRACT

The rotor of an axial-flow compressor with means for sealing the rotor blade tips relative to a casing wall provided with a coating is to be capable of abrasion but at the same time also low in wear. The present invention resolves these contradicting requirements for the coating on the casing in that individual blades, arranged between normally contoured, unshrouded rotor blades, are widened at their tips and reinforced with a radially outer layer, the material of which is matched to that of the coating. This will enable the coating to be subjected to less wear and to offer more resistance to erosion than heretobefore.

18 Claims, 4 Drawing Figures

ROTOR OF A COMPRESSOR, MORE PARTICULARLY OF AN AXIAL-FLOW COMPRESSOR

In compressors, especially axial-flow compressors, efficiency and operating behavior depend to a large extent on the ability to keep the width of the radial clearance or gap between the rotor blades and the casing as small as possible. In order to minimize the radial clearance, it can be adjusted by abrasion caused by blades rubbing against a casing liner (abradable running-in coating). The blades of the turbomachine, however, should suffer as little abrasive wear as possible, because otherwise, and especially with ovalized casings, the gaps grow and remain unfavorably large and the blades must be repaired at great cost or must be discarded for being too short.

The abradable (running-in) coatings on the casing, especially when they are soft, cause little blade tip wear, but have been shown to be sensitive to erosion and temperature.

A soft abradable coating has been described, for example, in GB-PS No. 733,918.

Described in DE-OS No. 28 53 958 and its U.S. counterpart, U.S. Pat. No. 4,227,703, is a gas seal and method for its manufacture, in which the point of a protruding portion of a composite material is fixedly connected to a turbine blade and takes the shape of a knife edge or fin. These fins are also referred to as squealer tips. From these tips, abrasive particles project in the direction of the protrusion. In this construction of an abrasive tip, particles are knocked out of the opposite sealing member to an undesirable degree.

It is the object of the present invention to provide a simple and inexpensive means for adjusting, especially for minimizing the radial clearance between the rotor blades and the casing of a compressor, especially of an aircraft gas engine or gas turbine power plant, which while being tolerant of wear, nevertheless minimizes the same.

The underlying problems are solved according to the present invention with rotors of the type described above in that the rubbing work is done by only one or a few "rubbing blades" in each compressor stage of a rotor. In order to achieve this favorable rubbing action the blade, in its area facing the casing, takes the shape of a shroud, and the shroudlike end area of the blade carries on its radially outer side a conventional hardfacing (protective layer) which is matched to the abradable coating on the casing. Matching of the material of the hard facing on the blade with that of the abradable coating is essential to provide minimal and smooth wearing of the abradable coating. In matching the properties of the materials, one need keep in mind that minimal or no wear is desired from the hard surface on the blade and thus a hard material is desired, such that portions thereof will not be pealed off from the blade tip. Coeficients of expansion of the matched materials should be as close to one another as possible so that heat changes do not produce relative expansions that could cause excessive abraiding or excessive leakage around the blade tip. What is desired is a good contact of the abradable material on the blade tip and a smooth rubbing action by the blade tip, without excessive wear and without undesirable rubbing or tearing. Lastly, the matching should pair two materials that will not enter into undesirable reactions with one another and especially chemical reactions.

The major advantages of the present invention reside in that the new blade with its wear-resistant tip enables harder, erosion and heat resistant abradable coatings to be used on the casing without aggravating blade tip wear. The radial clearance between the rotor blades and the casing is easy to adjust and to minimize, owing to the shroud-like widening of the blade and to the selection of the layer thickness of hardfacing applied to the blade tip.

The inventive concept expressly embraces all combinations and subcombinations of the features contained herein, also when combined with known features.

These and other objects, features and advantages of the present invention will become more apparent from the following description when taken in connection with the accompanying drawing which shows, for purposes of illustration only, one embodiment in accordance with the present invention, and wherein:

Referring now to the drawing, wherein like reference numerals are used throughout the various views to designate corresponding parts, FIG. 1 illustrates a rotor with two symmetrically arranged blades in accordance with the present invention.

Figure 2:
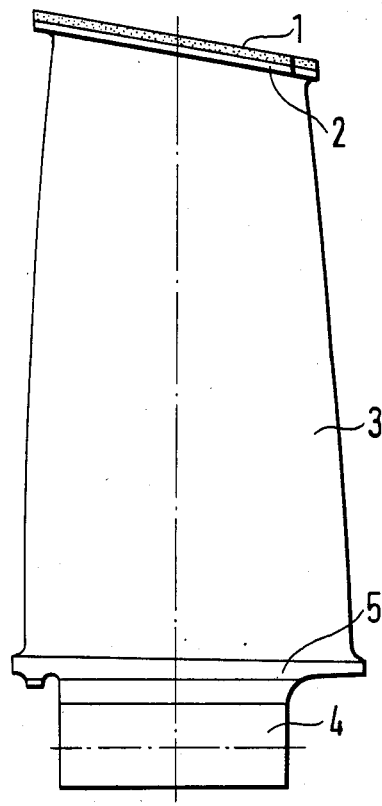
FIG. 2 is a view of a blade in accordance with the present invention, taken in a direction transverse to the direction of flow through an axial-flow compressor.

As it will become apparent from FIG. 2, the blades take a shape normal for rotor blades used in axial-flow compressors. The configuration, the material and the type of manufacture of the blade can be selected within wide limits. This also applies to the manner of securing the blade root in the rotor disk.

Figure 3:
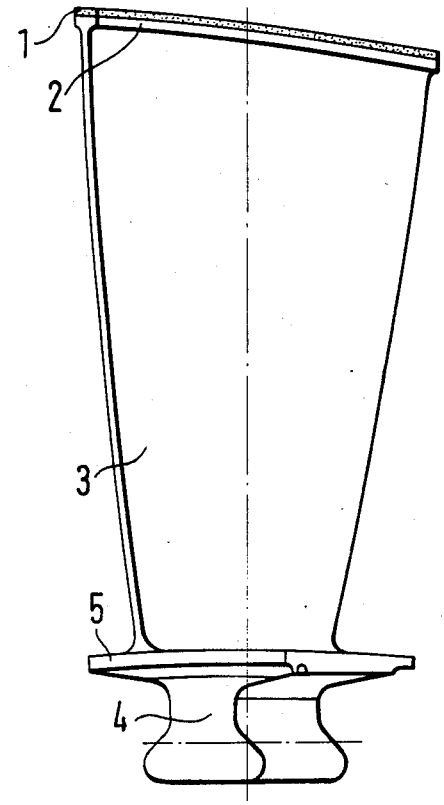
FIG. 3 is a perspective view of the blade of FIG. 2, taken essentially in the direction of flow.
Figure 4:
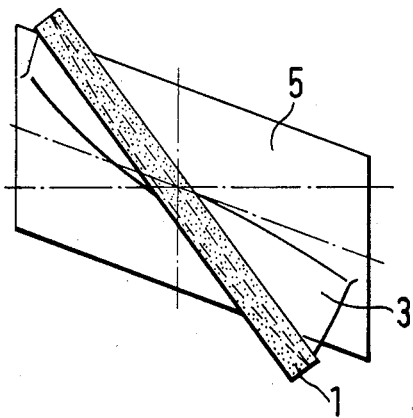
FIG. 4 is a plan view illustrating the blade of FIGS. 2 and 3.

The wear-resistant layer 1 (hardfacing) is deposited on a widened portion in the end area 2 of the tip of the blade 3. The root is indicated by the numeral 4 and has an inner platform 5 (cf. especially FIG. 3). The contour of the twisted blade 3 is shown in FIG. 4 in broken line. It takes the form of an aerofoil section.

The hardfacing is deposited on the radially outer end of the blade, on the tip thereof and adjacent to the casing and especially adjacent to its abradable coating. The layer consists, at least on the surface facing the casing, of a wear-resistant material, such as a hard material. Suited especially for that purpose are materials of the tungsten carbide, silicon carbide, chromium carbide group in applications in the lower and medium temperature ranges. For elevated temperatures, the layer can advantageously be titanium carbide, titanium nitride or silicon nitride. Also other materials of comparable wear-resistance would be suitable for the intents of the present invention, especially ceramic materials, such as metal oxides or other metal compounds and also mixtures of materials. When selecting the material for the hardfacing, however, it should be remembered that it should bond readily with the blade material, such as steel, nickel, chromium, titanium alloys or others, and that it should mate well with the abradable coating on the casing, against which it may rub. Excessive wear and undesirable rubbing should be avoided especially when the casing becomes out-of-round to take an oval or polygonal shape. This may happen in transient operating states, such as start, acceleration and shut-down or coast-down of the axial-flow compressor. These conditions may give rise to irregular thermal and/or mechanical loads and stresses and non-uniform expansions of the casing and rotor.

If the wear-resistant layer of the present invention is selected from among such materials as will optimally reduce abrasive wear, no risk is involved at the blade tip. With a suitable selection of matched or paired materials to take into consideration, the problems mentioned above the radial clearance between the rotor blade tips and the casing can also be kept practically constant. Nor should the mated materials of the hardfacing on a blade tip and the abradable coating on the casing enter into undesirable reactions, and especially chemical reactions should be avoided.

The above-mentioned preferred materials are deposited on the blade tip at its shroud-like widened portion in the end area 2 either directly or with the intervention of a bond layer, for example, by detonation or plasma spray process or by physical or chemical vapor deposition (PVD or CVD). The process should be chosen to suit the materials selected for the layer taking into consideration the above-mentioned conditions. The preferred layer thicknesses thereby lie between about 0.1 mm to about 1 mm, however, they may conventionally deviate either way from this range depending on the process and material selected.

A blade provided with the wear-resistant layer 1 of the present invention is bound to be appreciably heavier than the other blades of the same stage that do not have the layer and the shroud-like widening at the blade tip. The extra weight will lead to greater centrifugal forces and, thus, to increased low-cycle fatigue in the blade root. If necessary, this situation can be remedied, however, by giving the blade root larger dimensions than the root of other blades. The corresponding slot in the rotor disk will likewise have to be adjusted to accommodate the changed size of the blade root. Rather than changing dimensions, however, it may be preferable to select a different material for the root 4, which should then be fixedly connected to the airfoil 3, e.c., by welding.

Figure 1:
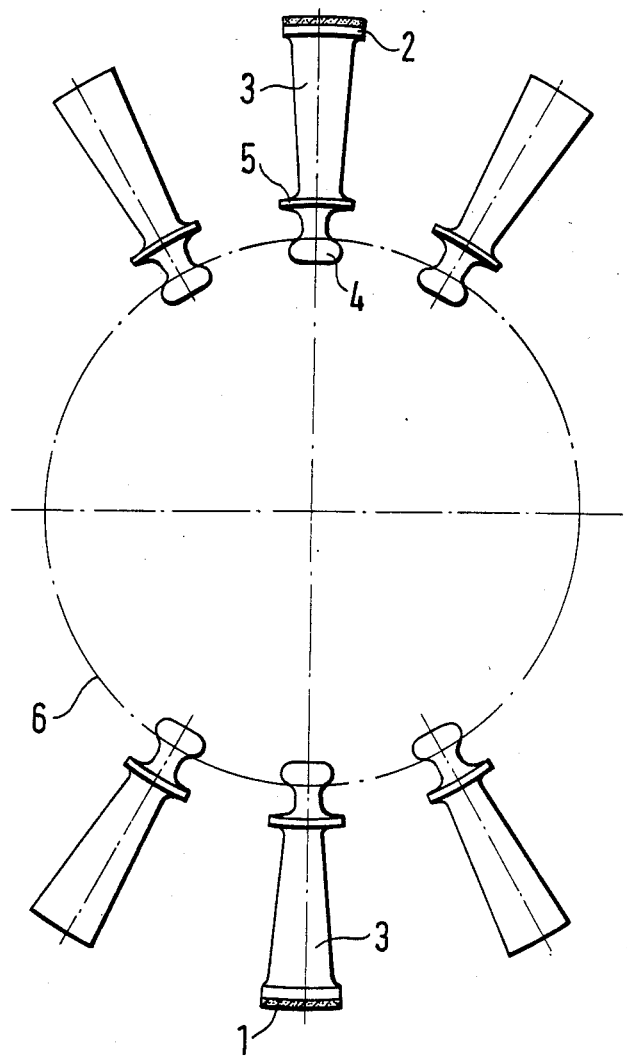
FIG. 1 is a schematic elevational view of a rotor with individual blades in accordance with the present invention.

If it is intended to install more than one blade of the present invention in the rotor disk, use should preferably be made of an even number of blades, and the blades should be symmetrically spaced around the circumference of the disk to prevent imbalance or other problems (FIG. 1).

The inventive concept naturally embraces also modifications and other versions. To be conducive to favorable flow conditions, the width of the shroud need not necessarily bridge the full distance between blades.

The invention finds preferred use in axial-flow compressors of aircraft engines in combination with gas turbines, where normally several compressor stages (also alternating with guide vanes) plus several turbine stages are arranged on a shaft. In this arrangement, the thermal load on the compressor blades is as a rule less than that on the hot gas wetted turbine blades.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:
1. A rotor of an axial-flow compressor, rotatable in a casing having an abradable coating, comprising a number of profiled shrouded and unshrouded rotor blades and means for minimizing the radial gap or clearance between the profiled, unshrouded rotor blades and the casing, the improvement wherein at least one of the shrouded blades has an end area facing the casing with a shroud-like shape, this shrouded end area carrying on its radially outer side a hardfacing of a material wear matched, with regard to wear, to the abradable coating.

2. A rotor according to claim 1, wherein the hardfacing on the blade consists of a material that is harder than the abradable coating on the casing and is chemically non-reactive therewith.

3. A rotor according to claim 1, wherein the hardfacing consists of a hard material.

4. A rotor according to claim 1, wherein the hardfacing is selected from the group essentially consisting of tungsten, silicon and chromium carbides.

5. A rotor according to claim 1, wherein the hardfacing is selected from the group essentially consisting of titanium carbide, titanium nitride and silicon nitride.

6. A rotor according to claim 1, wherein the hardfacing is deposited by detonation, plasma spray method or by physical or chemical separation from the gaseous phase.

7. A rotor according to claim 1, wherein the hardfacing layer is deposited on a metallic intermediate layer on the blade tip.

8. A rotor according to claim 1, wherein a shroud-like blade end area width is less than the spacing between compressor blades.

9. A rotor according to claim 1, wherein a root end area of the shrouded hardfacing blade away from the abradable coating is stiffened with respect to like root end areas of other unfaced blades.

10. A rotor according to claim 1, wherein several blades having a hardfacing in the end areas thereof are provided on a respective rotor.

11. A rotor according to claim 10, wherein the blades having a hardfacing are geometrically spaced around the circumference of the rotor.

12. A rotor according to claim 2, wherein the hardfacing is deposited by detonation, plasma spray method or by physical or chemical separation from the gaseous phase.

13. A rotor according to claim 2, wherein shroud-like blade end area width is less than the spacing between compressor blades.

14. A rotor according to claim 13, wherein a root end area of the shrouded hardfacing blades, pointing away from the abradable coating, is stiffened with respect to the root end areas of other unfaced blades.

15. A rotor according to claim 14, wherein several blades having a hardfacing in the end areas thereof are provided on a respective rotor.

16. A rotor according to claim 15, wherein the blades having a hardfacing are geometrically spaced around the circumference of the rotor.

17. A rotor according to claim 11, wherein the geometric spacing is symmetrical with a blade having a hardfacing being opposed, at 180° around the circumference of the rotor, with another blade having a hardfacing.

18. A rotor according to claim 16, wherein the geometric spacing is symmetrical with a blade having a hardfacing being opposed, at 180° around the circumference of the rotor, with another blade having a hardfacing.

* * * * *